United States Patent [19]

Wennik

[11] Patent Number: 5,178,416
[45] Date of Patent: Jan. 12, 1993

[54] APPARATUS FOR MONITORING AND MODIFYING THE INTAKE OF NUTRIENTS

[76] Inventor: Roberta S. Wennik, P.O. Box 83, Lynnwood, Wash. 98046-0083

[21] Appl. No.: 617,607

[22] Filed: Nov. 26, 1990

[51] Int. Cl.⁵ ............................................. G09B 19/22
[52] U.S. Cl. ..................................... 283/52.1; 283/42; 283/48.1; 283/115; 283/900; 283/63.1; 281/15.1; 281/16; 434/127
[58] Field of Search ..................... 283/67, 42, 38, 40, 283/48.1, 52.1, 115, 900, 63.1; 281/15.1, 16; 434/127, 430

[56] References Cited

U.S. PATENT DOCUMENTS

| | | | |
|---|---|---|---|
| 1,074,684 | 10/1913 | Bacon | 283/42 |
| 1,281,295 | 10/1918 | Cody | 283/52.1 |
| 2,381,494 | 8/1945 | Gulbransen | 434/127 |
| 3,561,147 | 2/1971 | Valencia | 283/42 |
| 3,841,260 | 10/1974 | Sharp et al. | 434/127 |
| 4,011,671 | 3/1977 | Fogel et al. | |
| 4,606,555 | 8/1986 | Adams | 283/52 |
| 4,631,678 | 12/1986 | Angermuller et al. | 283/67 |
| 4,650,218 | 3/1987 | Hawke | 283/67 |
| 4,832,603 | 5/1989 | Basil | 434/127 |

Primary Examiner—P. W. Echols
Assistant Examiner—David P. Bryant

[57] ABSTRACT

A method and apparatus for allowing the user to simultaneously monitor and modify the intake of specific nutrients in a graphical manner. A booklet is utilized for simultaneously monitoring two independent nutrients so as to ensure that the total amount of intake of the first and second nutrients satisfies the requirements of their respective predetermined values. The booklet includes a chart with a series of vertical and horizontal marks to form a grid with numerical labels along the edges of the grid. The user determines the maximum daily intake of the two nutrients based on specific parameters for the individual. A line is drawn parallel to each axis of the chart to indicate the minimum or maximum daily intake of each nutrient. The intersection of the lines is the starting point for each day, graphically showing the user the allowable quantities for each nutrient. The booklet also includes food listings which supply the user with the necessary values for charting each of the variables. Any time a food is consumed, the user simply counts on the grid, vertically and horizontally, the number of units corresponding to the nutrients plotted on the vertical and horizontal axes, respectively. The resulting point on the graph gives the user a simple graphical and numerical indication of the amount of each nutrient that can still be consumed during that day. When a point intersects either axis, the user readily sees that no more of that particular nutrient may be consumed.

4 Claims, 4 Drawing Sheets

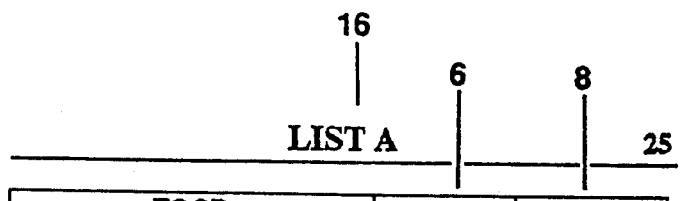

BEEF

*Unless noted, serving size is 3.5 oz, cooked (baked or broiled without extra fat)*

| | | |
|---|---|---|
| Brisket, L | 3 | 5 |
| Brisket, LF | 12 | 5 |
| Calf liver, pan fried | 3 | 24 |
| Chuck pot roast, L | 4 | 5 |
| Chuck pot roast, LF | 11 | 5 |
| Chuck stew, L | 4 | 5 |
| Chuck stew, LF | 11 | 5 |
| Chuck steak, LF | 11 | 4 |
| Chuck steak, no bone, L | 6 | 5 |
| Corned beef | 14 | 5 |
| Corned beef, canned | 6 | 5 |
| Eye round roast, L | 3 | 3 |
| Eye round roast, LF | 6 | 4 |
| Flank steak, L | 6 | 4 |
| Flank steak, LF | 7 | 4 |
| Frankfurter, beef (2 oz) | 7 | 1 |
| Ground, extra lean | 6 | 4 |
| Ground, lean | 7 | 4 |
| Ground, regular | 8 | 4 |
| Kidney | 1 | 19 |
| Liver, braised | 3 | 19 |
| Liver, pan fried | 5 | 24 |
| Porterhouse steak, L | 5 | 5 |
| Porterhouse steak, LF | 12 | 5 |
| Rib roast, L | 5 | 4 |
| Rib roast, LF | 9 | 4 |
| Round, bottom, L | 3 | 5 |
| Round, bottom, LF | 6 | 5 |
| Round, top, L | 2 | 4 |
| Round, top, LF | 3 | 4 |
| Short ribs, L | 8 | 5 |
| Short ribs, LF | 18 | 5 |
| Sirloin steak, L | 4 | 4 |
| Sirloin steak, LF | 7 | 4 |
| T-bone steak, L | 4 | 4 |
| T-bone steak, LF | 10 | 4 |

\* *When having two servings, count as "1", not "0"*

LIST B 1

| FOOD | DOWN | OVER |
|---|---|---|

BEEF

*Unless noted, serving size is 3.5 oz, cooked (baked or broiled without extra fat)*

| Food | Down | Over |
|---|---|---|
| Kidney | 1 | 19 |
| Round, top, L | 2 | 4 |
| Veal loin chop, L | 2 | 4 |
| Veal shoulder arm roast, L | 2 | 5 |
| Eye round roast, L | 3 | 3 |
| Round, top, LF | 3 | 4 |
| Brisket, L | 3 | 5 |
| Round, bottom, L | 3 | 5 |
| Liver, braised | 3 | 19 |
| Calf liver, pan fried | 3 | 24 |
| Sirloin steak, L | 4 | 4 |
| T-bone steak, L | 4 | 4 |
| Tenderloin, roasted, L | 4 | 4 |
| Chuck pot roast, L | 4 | 5 |
| Chuck stew, L | 4 | 5 |
| Rib roast, L | 5 | 4 |
| Porterhouse steak, L | 5 | 5 |
| Veal cutlet, LF | 5 | 5 |
| Liver, pan fried | 5 | 24 |
| Eye round roast, LF | 6 | 4 |
| Flank steak, L | 6 | 4 |
| Ground, extra lean | 6 | 4 |
| Chuck steak, no bone, L | 6 | 5 |
| Corned beef, canned | 6 | 5 |
| Round, bottom, LF | 6 | 5 |
| Veal loin chop, LF | 6 | 5 |
| Veal loin roast, LF | 6 | 5 |
| Veal shoulder arm roast, LF | 6 | 5 |
| Frankfurter, beef (2 oz) | 7 | 1 |
| Flank steak, LF | 7 | 4 |
| Ground, lean | 7 | 4 |
| Sirloin steak, LF | 7 | 4 |
| Ground, regular | 8 | 4 |
| Short ribs, L | 8 | 5 |
| Veal rib chop, no bone, LF | 8 | 5 |

\* When having two servings, count as "1", not "0"

APPARATUS FOR MONITORING AND MODIFYING THE INTAKE OF NUTRIENTS

DESCRIPTION

1. Technical Field

The present invention relates to a method and apparatus for monitoring and modifying the intake of one or two nutrients at a time utilizing a one-dimensional or two-dimensional chart.

2. Background of the Invention

There are many known diet plans involving the monitoring of caloric intake and monitoring weight loss over time. For instance, U.S. Pat. No. 4,606,555, to Adams, and U.S. Pat. No. 4,650,218, to Hawke, are directed toward diet-control techniques which monitor caloric intake through a food exchange system. In these systems, a food counter is provided containing a plurality of tabs or "exchanges" corresponding to the total amount of foods allowed in a single day. As the person eats a particular food, the person removes the appropriate exchange from the counter. When there are no longer any exchanges remaining on the counter, the person has ingested the total amount of permissible foods in that day corresponding to a predetermined amount of calories.

The problem with such a system is that it is inadequate for people interested in focusing on controlling specific nutrients in their diet, whether for personal or medical reasons. Research is revealing that for a person to decrease his/her risk of certain diseases, specific nutrients must be either increased or decreased. For example, to decrease the risk of heart disease, the intake of total fat, saturated fat, and cholesterol should be reduced. And, to decrease the risk of certain types of cancer, more soluble and insoluble fibers need to be included in the diet. However, the food exchange system described above is inadequate because it does not allow for specific attention to be paid to particular nutrients. Another shortcoming of such food exchange systems is that people cannot individualize or customize the food exchanges allowed for each day's intake. Given a particular daily caloric intake, these methods use a predetermined number of exchanges for each food group. For example, a 1,500-calorie diet calls for seven meat exchanges and two milk exchanges. If an individual were required, or wanted, to have three servings of milk instead of two, there is no way to accommodate this desired change. A milk exchange is equivalent to approximately one meat exchange, 4/5 of a bread exchange, and one fat exchange (for low-fat milk). Because this information is not supplied to the user, there is no way for the user to remove the appropriate tabs in order to make the desired substitution. Such an inflexible plan is not likely to be religiously followed and, therefore, is not likely to be successful.

With the tab system, there is no provision for those times when people exceed their daily limit. Once the last tab has been removed, if a person continues to eat, there is no way to keep track of or note the excess. Even though the individual is supposed to stay within a daily limit, there should be a way to record the occurrence of an overage to increase personal awareness. Research has shown that for behaviors to change, feedback is a necessary component.

U.S. Pat. No. 4,011,671, to Fogel et al., discloses a chart for monitoring weight loss over time. In particular, the patent discloses a two-dimensional chart with the horizontal axis representing time and the vertical axis representing weight. The user locates the date on one axis and his/her weight for that date on the other axis. The point on the chart where the two parameters intersect is marked. This darkened dot represents the two parameters—weight and date of that weighing. A line is then drawn to connect all points marked providing a graphical illustration of weight loss over time. The dots themselves are not actually counted off in the process of marking a new weight for a subsequent date. The dots in the matrix serve strictly as reference points indicating the values of two parameters at one time, i.e., corresponding to weight on one axis and date of that weighing on the other axis. A deficiency of this system is that while people can see their weight loss graphically, they cannot tell, based on the numbers on the axes, the number of pounds remaining to be lost to reach their goal weight.

U.S. Pat. No. 4,011,671 is inadequate in providing people with a method of losing weight. No concern is given to the impact of what the person is eating and its effect on weight gain or loss.

SUMMARY OF THE INVENTION

The present invention resides in a method and apparatus for allowing the user to simultaneously monitor and modify the intake of specific nutrients in a graphical manner. In particular, according to a preferred embodiment of the invention, a booklet is utilized for simultaneously monitoring two independent variables so as to ensure that the total amount of intake of the first and second variables is below a first maximum value and a second maximum value, respectively. The booklet comprises a chart for charting graphical information thereon; a first scale disposed on the chart forming one axis of the chart for charting one of the variables; a second scale disposed on the chart forming a second axis of the chart for charting the other of the variables wherein the variables are monitored by: (a) marking a starting point at the intersection between a line extending from a first point on the first scale parallel to the second scale and a line extending from a second point on the second scale parallel to the first scale, the first and second points corresponding to the first maximum value and the second maximum value, respectively; (b) determining and marking a first successive point from the starting point by counting off on the matrix through consecutive points, in a vertical direction corresponding to the amount of intake of the first variable, and then, in a horizontal direction corresponding to the amount of intake of the second variable. Each successive point is charted in like manner from the last marked successive point; (c) repeating step (b) for each intake of the first and second variables until the new starting point contacts one of the first and second scales indicating that one of the first and second maximum values of the first and second variables, respectively, has been consumed; (d) when the new successive point contacts one of the scales before contacting the other, monitoring shall continue as in step (b) for the variable which has not been consumed up to its maximum value, parallel to the scale for that variable, and on the portion of the matrix corresponding to zero allowance for the variable consumed up to its maximum value. Notation should be made of the values of consumption of the completed variable which are greater than that variable's maximum value.

In a preferred embodiment, the first and second variables are first and second nutrients, respectively, ingested by eating food, and the first and second scales are disposed orthogonally with respect to one another. The booklet further includes food lists containing a listing of individual foods and the amount of the first and second nutrients contained in each of the individual foods, and an index containing a listing of each of the individual foods, each represented by an assigned number. One list of foods is organized in alphabetical order and the other in numerical order based on the numerical value of the amount of each nutrient in the foods. An index containing a listing of each of the individual foods with the appropriate page on which each of the foods is mentioned in both of the food lists is included.

BRIEF DESCRIPTION OF THE DRAWINGS

FIGS. 3 and 4 are front views of sample food lists according to the present invention.

DETAILED DESCRIPTION OF THE INVENTION

Figure 1:
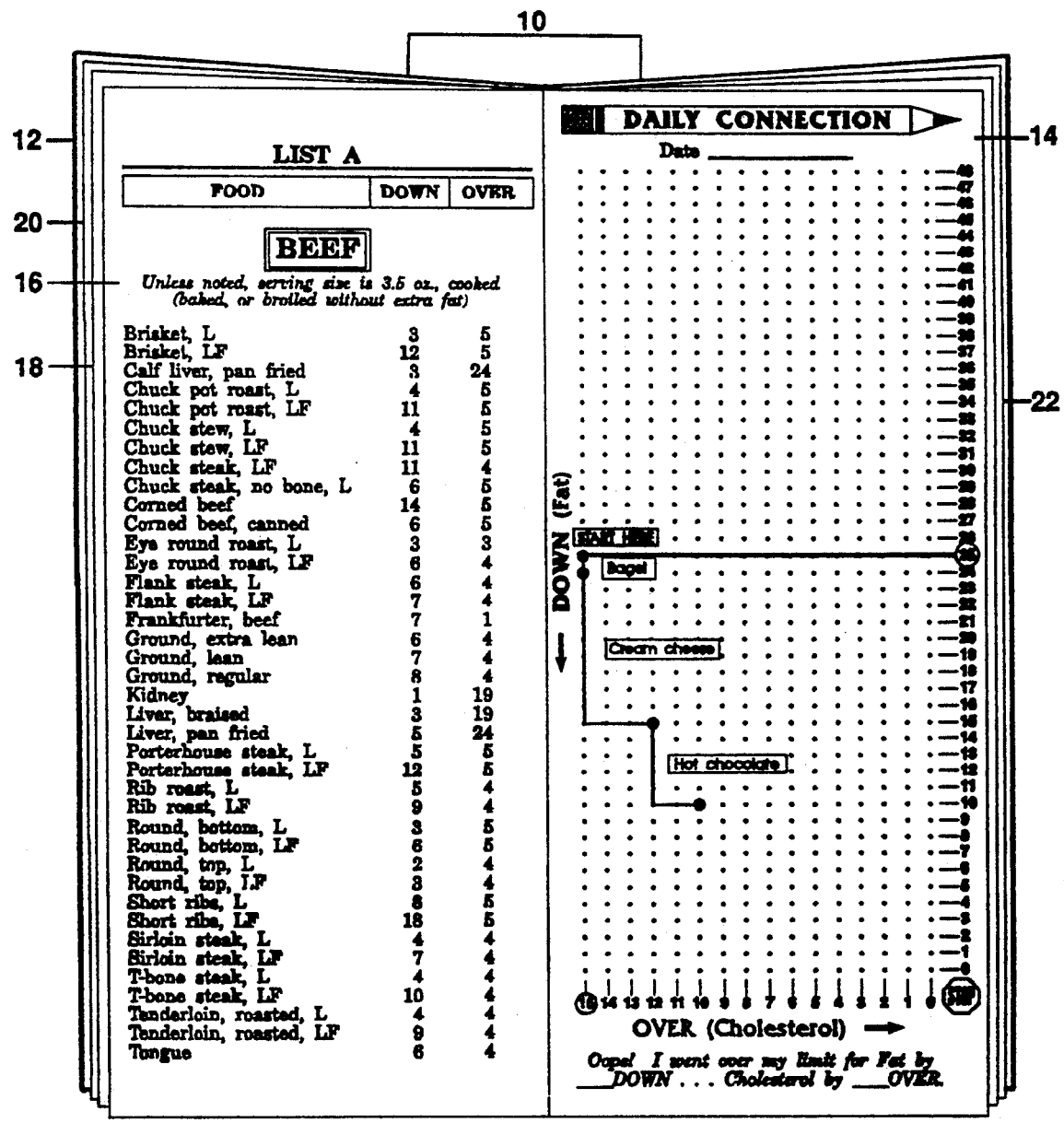
FIG. 1 is a perspective view of a nutritional monitoring book according to the present invention.

FIG. 1 illustrates a nutritional monitoring booklet used in the present invention. Referring thereto, the booklet 10 includes a number of pages, including a plurality of daily logs 14, alphabetical food list 16, numerical food list 18, food category list 20, and index of foods 22. Each of these pages are bound together and assembled in a cover 12 to form a single booklet 10 which is used for monitoring and modifying the nutritional intake of food by the user.

The index 22 provides a listing of each of the foods in the alphabetical food list and the numerical food list and refers the user to the appropriate page. The food category list 20 provides a listing of all food categories. Thus, for instance, the food category page provides a listing of such categories as BEEF, CHEESE, COOKIES, etc. and provides a reference to the appropriate alphabetical and numerical food list pages where these categories begin. When users know exactly what food they plan to eat, as well as what food category that food would be found under, they need not refer to the index 22. They can go directly into the alphabetical food list under the appropriate food category. However, they may not know what food category a particular food would be listed under, and would therefore, find the index helpful in directing them to the correct page, whether within the alphabetical food list or numerical food list. Thus, if the user wanted to eat a particular cheese, for example, cheddar cheese, he or she would first look in the food category list 20 to see what page the category CHEESE begins on in the alphabetical food list. Then he or she would find "cheddar" in this list under CHEESE. On the other hand, if the user was looking for suggestions of cheeses with, say, a lower fat content to modify his or her intake, he or she would refer to the numerical food list under the food category, CHEESE, to see the possible options, which are listed in ascending order of their fat content.

Figure 2:
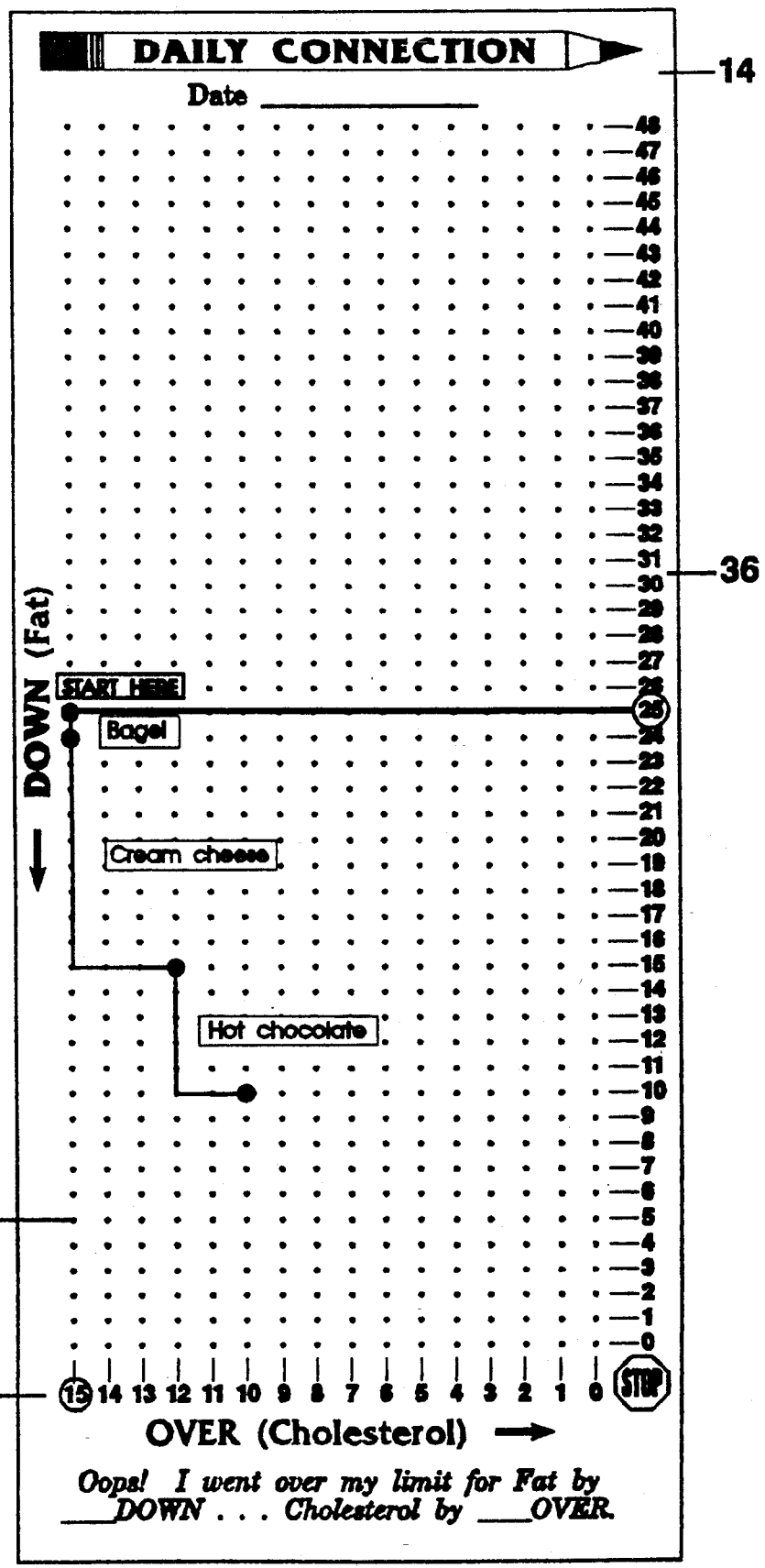
FIG. 2 is a front view of a daily log chart according to the present invention.

Referring to FIG. 2, the daily log chart illustrates both the design of the chart as well as the actual graphing process, discussed in detail below. Referring thereto, the chart consists of a vertical axis 36 and a horizontal axis 38. Each axis corresponds to a particular nutrient, the ingestion of which is being monitored. For instance, in the FIG. 2 example, the vertical axis corresponds to the amount of fat ingested while the horizontal axis corresponds to the amount of cholesterol ingested. In the illustrated example of FIG. 2, the coordinate "0,0" is disposed at the bottom right-hand side of the page with the numbers in the vertical column increasing as you proceed up the page, and the numbers in the horizontal column increasing as you proceed to the left of the page. Of course, it is understood that the opposite could be true and that the coordinate "0,0" could be on the bottom left-hand side of the page or on the top right- or left-hand side of the page.

The grid portion 40 of the daily log 14 consists of a matrix of dots, squares, circles, or the like corresponding to each of the horizontal and vertical numbers. The number of rows and columns of dots is determined by the nutrients being regulated. Therefore, the number of dots vertically may not necessarily be the same as the number of dots positioned horizontally. Each axis is numbered for the maximum allowable units of each of the nutrients which a human, taking into consideration age, size, and activity level, could healthfully ingest. It should be noted that while the daily log illustrated in FIG. 2 is arranged for monitoring fat and cholesterol intake, the daily log can be used to monitor the intake of any nutrient and, therefore, is not to be limited to the intake of cholesterol and fat.

Before discussing the method of monitoring the intake utilizing the daily log of FIG. 2, FIGS. 3 and 4 illustrate sample pages of the alphabetical food list 16 and the numerical food list 18, respectively. In particular, FIG. 3 provides an alphabetical list of the various meats within the BEEF category. Referring thereto, for each food the list provides a value for each of the two nutrients of interest which are being monitored on the daily log. The nutrient value corresponds to the amount of nutrient for a given food product, whether the actual grams, milligrams, or some other unit for the particular nutrient, or it may be a computed number. In particular, referring to FIG. 3, the amount of fat in pan fried calf liver is 3 units, denoted by the term "Down", corresponding to 3 grams of saturated fat, while the amount of cholesterol, referred to as "Over" is 24 units or 480 milligrams of cholesterol. The terms "Down" and "Over" are employed to instruct the user regarding the direction in which the lines should be drawn, both vertically and horizontally, respectively. Of course, if the "0,0" coordinate is disposed at another corner of the matrix, the directional terms would have to be appropriate for that configuration.

FIG. 4, i.e., the numerical food list 18, provides a list of the same foods listed in the alphabetical list 16 but in this case, listing the foods within food categories in ascending order of one of the nutrient values and then subsorting those foods in ascending order of the other nutrient value. For instance, all the meats with a "Down" value of 5 are subsorted in ascending order of their "Over" values. Thus, in FIG. 4, the foods are listed in ascending order in the "down" direction on the chart corresponding to the amount of fat content in each food and then further subsorted on the "Over" values for the cholesterol content. Although not specifically illustrated, an additional numerical food list could be provided where the first sorting is done on the "Over" nutrient (cholesterol in this example in the "Over" direction) and then subsorted on the "Down" nutrient (fat in this example).

Having described the forms and the daily log of the present invention, the following is a description of the method of monitoring and modifying the nutrients. Firstly, from instructions provided, the user determines a daily limit or allowance for each nutrient that is to be monitored. This allowance is based on the user's age, sex, height, weight, and activity level. Once established, the user circles on both the vertical and horizontal axes of the log, illustrated in FIG. 2, the numbers which represent his or her daily allowance, respectively, for both nutrients being monitored. For illustrative purposes herein, in the FIG. 2 sample, 25 units of fat have been circled on the vertical axis 35 and 15 units of cholesterol have been circled on the horizontal axis 38. In this example, the vertical units represent grams of saturated fat and the horizontal units represent milligrams of cholesterol. As noted above, any nutrient can be monitored in this manner; however, different units may be required. From each of the numbers circled, a horizontal and/or a vertical line is drawn to mark the maximum limits appropriate to the user on the user's personal log. In other words, these lines are the daily limit lines for each nutrient. When monitoring for nutrients with limits which must not be exceeded, these lines represent the maximum allowed for each nutrient. When monitoring for nutrients with minimum quantities that should be met, these lines represent the minimum target amount for each nutrient. The starting point for graphing is located where these two lines intersect. Of course, the starting point could occur at any one of the corners where two of the delineating lines intersect (delineating lines being the two scales and the two limit lines). The location of starting is determined by the configuration of the scales, whether they are in ascending or descending order. At the point of intersection, a notation "start here" is written in the log. When the food to be eaten has been selected and its nutrient values located in one of the two food lists, illustrated in FIG. 3 and 4, the graphing process begins. Commencing with the "start here" dot, a line is drawn down and then over to the right through the number of dots corresponding to the down and over values provided in the food list for the selected food. The dot is darkened at the resulting position of the down and over line drawing and becomes the new "start here" dot. Each food is successively graphed in this stair-stepping fashion until either 0 for one or both of the nutrients is reached in the rightmost lower corner, or corner diagonally opposite the starting point, or no more food is eaten for the day, whichever comes first. If 0 should be reached for one nutrient before the other, graphing can continue for the still available nutrient, as described previously, parallel to the scale for the available nutrient on the matrix corresponding to zero value for the completed nutrient. Notation of overages of nutrients is made in the space provided on the daily log.

At any time, the user can see how many more units of each nutrient can be eaten for the rest of the day. While the matrix itself is used for counting off each food's numerical values for both nutrients being monitored, the scales are used to reference how many units remain of each nutrient. This is accomplished by looking from the darkened point on the matrix to each scale. The number corresponding to that point reveals the number of units, for that nutrient, remaining.

FIG. 2 provides an example of this graphing technique. Referring thereto, an individual first decides that the maximum permissible amount of saturated fat is 25 grams and the maximum amount of permissible cholesterol is 300 milligrams, represented by 15 "Over" units. The person then marks the intersection of those two points "start here." In the example, the person is eating a bagel with 1½ ounces of cream cheese and hot chocolate made with milk. From either one of the food lists, illustrated in FIGS. 3 and 4, the user determines that these foods have the following values, respectively: 1 down (fat)/0 over (cholesterol); 9 down (fat)/3 over (cholesterol); and 5 down (fat)/2 over (cholesterol). The user then charts the daily log as illustrated.

As noted above, to find the down (fat) and over (cholesterol) values, the user consults either or both of the food lists illustrated in FIGS. 3 and 4. The alphabetical list of FIG. 3 would be checked if it were known what food was going to be eaten. On the other hand, the numerical list, organized in ascending order of the nutrient values, would be used when a choice of food is to be made which would fit into the remaining unused matrix of dots on the log. As noted above, each food in the list is assigned two values representing the two nutrients of interest. The values for these nutrients may be the actual grams, milligrams, or some other unit for the particular nutrient or may be computed numbers.

The user checks with the numerical list, partially illustrated in FIG. 4, for options of what to eat based on how many units of either or both nutrients remain to be eaten. To determine how many units this is, the user looks to the right and below the darkened dot to the numbers in the margin. This number tells how many more units of that particular nutrient the user can have or should have. This process can be and should be done after each food is logged in so that the user does not exceed his/her limit for either nutrient when trying to decrease the intake of certain nutrients. In the case of trying to increase the intake of certain nutrients, such as fiber, the user is trying to minimally achieve that limit and more.

In the above example, the user decided to have bagels with cream cheese and hot chocolate. Accordingly, the user would look at the alphabetical food list, knowing what was to be eaten. Finding out that the cream cheese has so many down (fat) values, the user might want to make a choice which is lower in that nutrient. In that case, the user would check the numerical list under the food category "cheese" to see if there was an acceptable choice with less down (fat) values.

As can be seen from the foregoing, the present invention provides a unique method for simultaneously monitoring and modifying the intake of two nutrients in a graphical manner.

It will be appreciated that, although specific embodiments of the invention have been described herein for purposes of illustration, various modifications may be made without departing from the spirit and scope of the invention. For example, the daily log could be a one-dimensional chart monitoring only one nutrient or parameter but still using the same approach to charting. Accordingly, the invention is not limited except as by the appended claims.

I claim:

1. A booklet for simultaneously monitoring the consumption of a first independent nutrient and a second independent nutrient so as to ensure that the total consumption of the first and second nutrients is below a first predetermined maximum value or meets a first predetermined minimum value and is below a second predetermined maximum value or meets a second predetermined minimum value, respectively, said maximum and minimum values being dependent upon the specific nutrient and a user'age, sex, height, weight, and activity level, said booklet comprising:

a charting means for charting graphical information thereon;

a first scale disposed on said charting means forming one axis of said charting means for charting the first nutrient;

a second scale disposed on said charting means, orthogonally intersecting said first scale, forming a second axis of said charting means for charting the second nutrient; and a food listing containing a listing of individual foods and the content of the first and second nutrients contained in each of said individual foods, said contents of the first and second nutrients being listed in units corresponding to said first and second scales, respectively, wherein the consumption of the two independent nutrients may be monitored by marking a starting point on said charting means corresponding to the predetermined minimum or maximum values for the first and second nutrients, marking additional points on said charting means corresponding to the consumption of the first and second nutrients until one of said additional points intersects with said first or second scale indicating the predetermined minimum or maximum value for the first or second independent nutrient has been consumed, and marking additional points on said charting means corresponding to the consumption of the remaining nutrient which has not been consumed to its predetermined minimum or maximum value, wherein said food listing comprises a first list and a second list, said first list containing an alphabetical listing of each of said individual foods and their respective nutrient content and said second list containing a listing of each of said foods in ascending numerical order based on their respective nutrient content.

2. The booklet of claim 1, further comprising an index containing a listing of each of said individual foods and appropriate food list pages corresponding to the location of each of said foods in said food listing.

3. The booklet of claim 1, wherein said charting means has an orderly grid of marks disposed thereon, each of said marks corresponding to a predetermined content of said first and second nutrients, whereby the marking of said additional points may be performed by counting the number of said grid marks corresponding to the content of the first and second nutrients consumed, respectively.

4. A booklet for simultaneously monitoring consumption of a first independent nutrient and a second independent nutrient so as to ensure that the total amount of consumption of the first and second nutrients meets the requirements of a first predetermined value and a second predetermined value, respectively, the first and second predetermine values being determined by a user's individual characteristics and the particular nutrients being monitored, comprising:

a chart for charting graphical information thereon;

a charting means made up of a matrix bordered by delineating lines, said delineating lines disposed on said chart in the form of a first scale, forming a first axis of said chart, a second scale, perpendicular to said first scale, forming a second axis of said chart, a first boundary line disposed on said chart parallel to first scale, and a second boundary line disposed on said chart parallel to said second scale;

said first scale for purposes of charting the consumption of the first nutrient;

said second scale for purposes of charting the consumption of the second nutrient;

said first boundary line on said chart formed by marking a line extending from a first location on said first scale parallel to said second scale corresponding to the first predetermined value;

said secondary boundary line on said chart formed by marking a line extending from a second location on said second scale parallel to said first scale, corresponding to the second predetermined value; and a food listing containing a listing of individual foods and the content of the first and second nutrients in each of said individual foods, said contents of the first and second nutrients being listed in units of measurement corresponding to said first and second scales respectively, wherein the consumption of the nutrients is monitored by marking a starting point at the intersection of said first and second boundary lines and marking a successive point from said starting point by counting off on said matrix in a first direction parallel to said first axis a number of units corresponding to the consumption of the first nutrient and counting off on said matrix in the direction perpendicular to said first direction and parallel to said second axis a number of units corresponding to the consumption of the second nutrient, wherein said food listing comprises a first list and a second list, said first list containing an alphabetical listing of each of said individual foods and their respective nutrient content and said second list containing a listing of each of said foods in ascending numerical order based on their respective nutrient content.

* * * * *